(12) United States Patent
Carvalho et al.

(10) Patent No.: US 11,374,733 B2
(45) Date of Patent: *Jun. 28, 2022

(54) SYNCHRONISATION SYMBOL DETECTOR

(71) Applicant: Imagination Technologies Limited, Kings Langley (GB)

(72) Inventors: Filipe Carvalho, Monmouthshire (GB); Taku Yamagata, Chepstow (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/203,531

(22) Filed: Mar. 16, 2021

(65) Prior Publication Data
US 2021/0226767 A1 Jul. 22, 2021

Related U.S. Application Data

(63) Continuation of application No. 16/457,981, filed on Jun. 29, 2019, now Pat. No. 10,985,901.

(30) Foreign Application Priority Data

Jun. 29, 2018 (GB) ..................................... 1810770

(51) Int. Cl.
*H04L 7/04* (2006.01)
*H04L 27/26* (2006.01)

(52) U.S. Cl.
CPC .......... *H04L 7/042* (2013.01); *H04L 27/2663* (2013.01)

(58) Field of Classification Search
CPC . H04L 7/042; H04L 27/2662; H04L 27/2663; H04L 27/2673; H04L 27/2675; H04L 27/2681; H04L 27/2688; H04L 27/2647; H04L 27/2655
See application file for complete search history.

(56) References Cited

U.S. PATENT DOCUMENTS

| 8,537,939 B2 | 9/2013 | Kawauchi et al. |
| 10,985,901 B2 * | 4/2021 | Carvalho ............ H04L 27/2663 |
| 2010/0296002 A1 | 11/2010 | Cheng et al. |

OTHER PUBLICATIONS

Digital Video Broadcasting (DVB); Implementation guidelines for a second generation digital terrestrial television broadcasting system (DVB-T2) ETSI TS 102 831, Aug. 2012.

* cited by examiner

*Primary Examiner* — Betsy Deppe
(74) *Attorney, Agent, or Firm* — Potomac Law Group, PLLC; Vincent M DeLuca

(57) ABSTRACT

A synchronisation symbol detector that comprises two correlation modules and a comparison module. The first correlation module performs one or more correlations between the input signal and a down-converted version of the input signal and generates a first correlation metric from the one or more first correlations. The second correlation module performs one or more second correlations between the input signal and an up-converted version of the input signal and generates a second correlation metric from the one or more second correlations. The comparison module is configured to compare the first correlation metric and the second correlation metric and determine whether the input signal comprises a synchronisation symbol based on the comparison.

18 Claims, 12 Drawing Sheets

SYNCHRONISATION SYMBOL DETECTOR

CROSS-REFERENCE TO RELATED APPLICATIONS AND CLAIM OF PRIORITY

This application is a continuation under 35 U.S.C. 120 of copending application Ser. No. 16/457,981 filed Jun. 29, 2019, now U.S. Pat. No. 10,985,901, which claims foreign priority under 35 U.S.C. 119 from United Kingdom Application No. 1810770.6 filed Jun. 29, 2018.

BACKGROUND

In any communication system, synchronisation between the transmitter and receiver is key to enabling communication. In some wireless communication standards, the transmitted signal is configured to include one or more synchronisation symbols which can be used by the receiver to detect and acquire the received signal. For example, in Digital Video Broadcasting-Second Generation Terrestrial (DVB-T2) each frame comprises a synchronisation symbol, referred to as a P1 symbol, which enables the receiver to determine the presence of a DVB-T2 signal. FIG. 1 illustrates an example DVB-T2 frame 102 which begins with a P1 symbol 104, one or more P2 symbols 106 and a plurality of data symbols 108.

The P1 symbol 104 comprises three parts—C 110, A 112 and B 114. The main part A 112 is an 1 k orthogonal-frequency-division-multiplexing (OFDM) symbol. Part C 110, which precedes part A 112, is an up-converted (by frequency $f_{sh}$) version of a first portion A1 116 of part A 112; and part B 114, which follows part A 112, is an up-converted (by frequency $f_{sh}$) version of a second portion A2 118 of part A 112. Since portions of the P1 symbol are repeated in the symbol, a P1 symbol can be detected through auto-correlation-based methods.

Specifically, P1 symbol detectors are typically configured to perform two auto-correlations on the input signal. A down-converted version of the input signal is generated in which the frequency shift $f_{sh}$ in parts C 110 and B 114 has been removed. A first correlation is then performed between the input signal and the down-converted version of the input signal such that the first portion A1 116 of part A 112 of the input signal is compared with part C 110 of the down-converted version of the input signal. A second correlation is then performed between the input signal and the down-converted version of the input signal such that the second portion A2 118 of part A 112 of the input signal is compared with part B 114 of the down-converted version of the input signal. If the input signal comprises a P1 symbol then the first portion A1 116 of part A 112 of the input signal will match part C 110 of the down-converted version of the input signal causing a peak in the first auto-correlation output, and the second portion A2 118 of part A 112 of the input signal will match part B 114 of the down-converted version of the input signal causing a peak in the output of the second auto-correlation. A correlation metric is then generated from the outputs of the two auto-correlations (e.g. by aligning the expected peaks in the outputs of the two correlations and multiplying the aligned outputs). A P1 symbol may then be detected when the correlation metric exceeds a predetermined threshold.

However, such P1 symbol detectors are very sensitive to the amplitude of the input signal which makes them prone to false P1 symbol detections in the presence of amplitude spikes or variations in the input signal.

The embodiments described below are provided by way of example only and are not limiting of implementations which solve any or all of the disadvantages of known synchronisation symbol detectors.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are synchronisation symbol detectors, and methods, for detecting synchronisation symbols in an input signal. The synchronisation symbol detectors comprise two correlation modules and a comparison module. The first correlation module performs one or more correlations between the input signal and a down-converted version of the input signal and generates a first correlation metric from the one or more first correlations. The second correlation module performs one or more second correlations between the input signal and an up-converted version of the input signal and generates a second correlation metric from the one or more second correlations. The comparison module is configured to determine whether the input signal comprises a synchronisation symbol based on a comparison of the first and second correlation metrics.

A first aspect provides a synchronisation symbol detector for detecting a synchronisation symbol in an input signal, the detector comprising: a first correlation module configured to perform one or more first correlations between the input signal and a down-converted version of the input signal and generate a first correlation metric based on the one or more first correlations; a second correlation module configured to perform one or more second correlations between the input signal and an up-converted version of the input signal and generate a second correlation metric based on the one or more second correlations; and a comparison module configured to determine whether the input signal comprises a synchronisation symbol based on a comparison of the first and second correlation metrics and output an indication of the determination.

A second aspect provides a method of detecting a synchronisation symbol in an input signal, the method comprising: performing one or more first correlations between the input signal and a down-converted version of the input signal and generating a first correlation metric based on the one or more first correlations; performing one or more second correlations between the input signal and an up-converted version of the input signal and generating a second correlation metric based on the one or more second correlations; determining whether the input signal comprises a synchronisation symbol based on a comparison of the first and second correlation metrics; and outputting an indication of the determination.

The synchronisation symbol detector may be embodied in hardware on an integrated circuit. There may be provided a method of manufacturing, at an integrated circuit manufacturing system, the synchronisation symbol detector. There may be provided an integrated circuit definition dataset that, when processed in an integrated circuit manufacturing system, configures the system to manufacture the synchronisation symbol detector. There may be provided a non-transitory computer readable storage medium having stored thereon a computer readable description of a synchronisation symbol detector that, when processed in an integrated circuit manufacturing system, causes the integrated circuit manufacturing system to manufacture an integrated circuit embodying a synchronisation symbol detector.

There may be provided an integrated circuit manufacturing system comprising: a non-transitory computer readable storage medium having stored thereon a computer readable description of the synchronisation symbol detector; a layout processing system configured to process the computer readable description so as to generate a circuit layout description of an integrated circuit embodying the synchronisation symbol detector; and an integrated circuit generation system configured to manufacture the synchronisation symbol detector according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
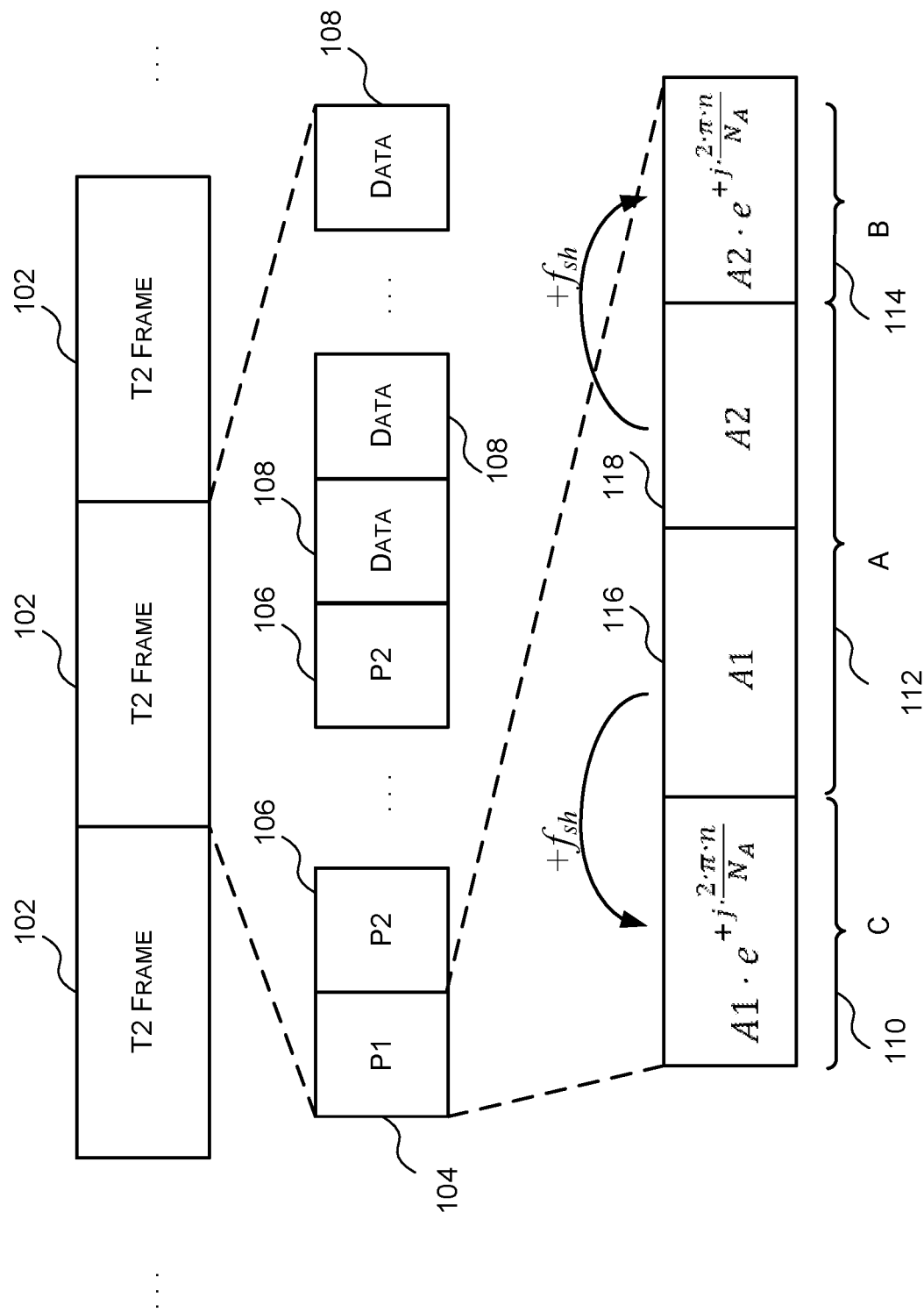
FIG. 1 is a schematic diagram of the structure of a P1 symbol.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Described herein are synchronisation symbol detectors for detecting a synchronisation symbol in an input signal. The synchronisation symbol detectors comprise two correlation modules and a comparison module. The first correlation module performs one or more correlations between the input signal and a down-converted version of the input signal and generates a first correlation metric from the one or more first correlations. The first correlation module is configured such that when the input signal comprises a synchronisation symbol and has a normal or expected spectrum (as opposed to an inverted spectrum) the first correlation metric will comprise a peak. The second correlation module performs one or more second correlations between the input signal and an up-converted version of the input signal and generates a second correlation metric from the one or more second correlations. The second correlation module is configured such that when the input signal comprises a synchronisation symbol and has an inverted spectrum the second correlation metric will comprise a peak. The comparison module is configured to determine whether a synchronisation symbol is present in the input signal based on a comparison of the first and second correlation metrics.

As described in more detail below, synchronisation symbol detectors configured to detect synchronisation symbols in an input signal via one or more auto-correlations of the input signal and a frequency-shifted version of the input signal typically have one correlation module that is configured such that there will be a peak in the correlation metric generated thereby when the input signal comprises a synchronisation symbol and the input signal has a normal spectrum. Such synchronisation symbol detectors are thus able to detect synchronisation symbols when the input signal comprises a normal spectrum but are typically unable to detect synchronisation symbols when the input signal has an inverted spectrum. Such synchronisation symbol detectors are also very sensitive to the amplitude of the input signal which makes them prone to incorrectly detecting a synchronisation symbol in the presence of amplitude spikes or variations in the input signal. Adding a second correlation module that is configured such that there will be a peak in the correlation metric generated thereby when the input signal comprises a synchronisation symbol and has an inverted spectrum not only allows the synchronisation symbol detector to detect synchronisation symbols when the input signal has an inverted spectrum but also allows the synchronisation symbol detector to reduce the number of false positives. This is because a spike or rapid variation in amplitude in the input signal will have a similar effect on both correlation modules causing both correlation metrics to have a peak or spike. In contrast, when there is a true synchronisation symbol in the input signal only one of the correlation metrics will have a peak or spike Although example synchronisation symbol detectors will be described below as being configured to detect P1 symbols in a DVB-T2 signal it will be evident to a person of skill in the art that these are examples only and that the detectors, methods and techniques described herein may also be used to detect other synchronisation symbols that can be detected via one or more correlations of the input signal and one or more frequency-shifted versions of the input signal. For example, the methods and techniques described herein may also be used to detect synchronisation symbols in ATSC 3.0. Specifically, in ATSC 3.0 there is a synchronisation symbol that comprises three parts—a main part A that comprises a symbol, a second part C that comprises a frequency shifted version of a portion of part A (i.e. the last 520 samples) and a third part B which is a frequency shifted version of a portion of part C (i.e. the first 504 samples of part C).

Figure 2:
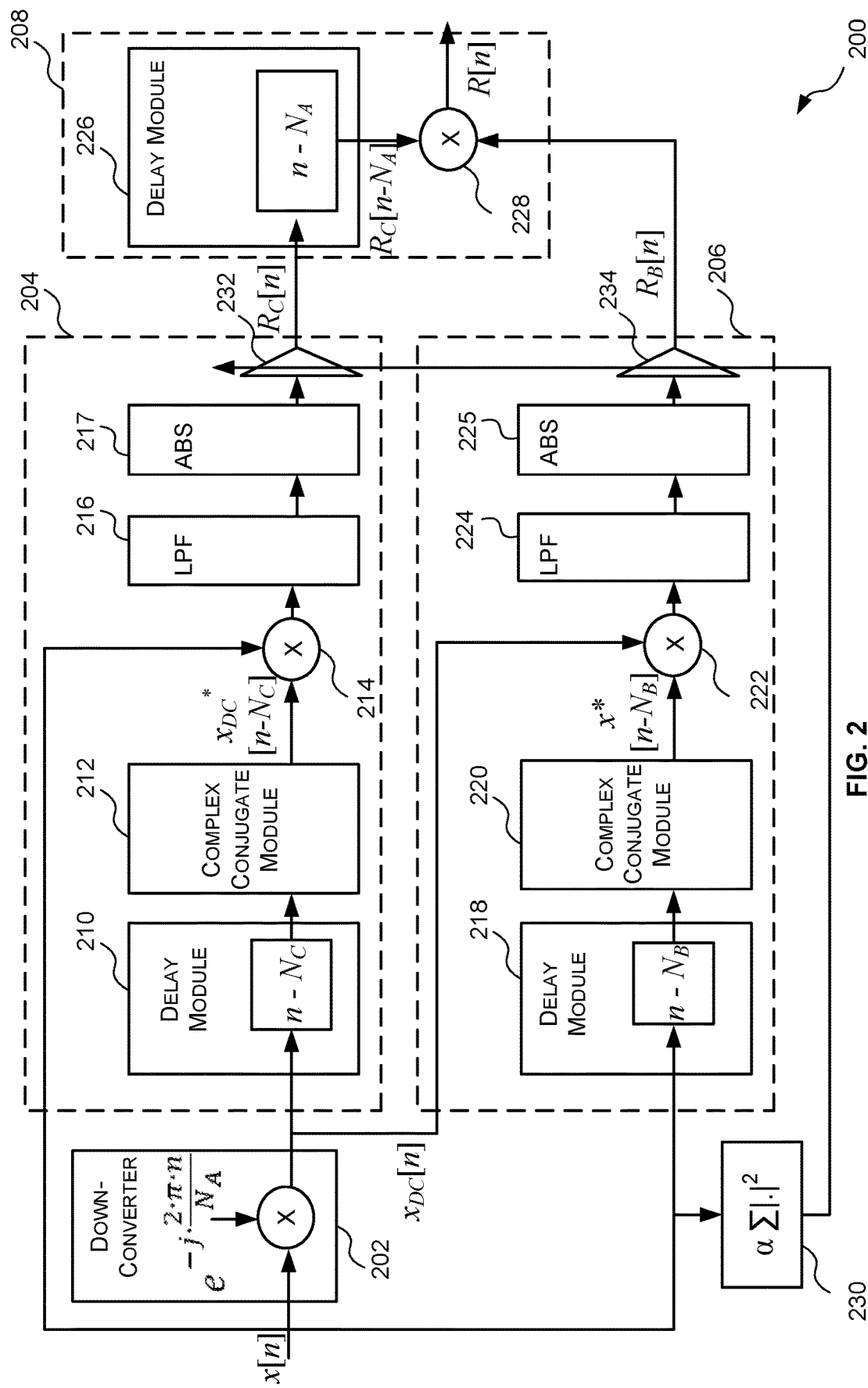
FIG. 2 is a block diagram of an example correlation module for use in a P1 symbol detector.

Reference is now made to FIG. 2 which illustrates an example correlation module 200 which may be used in a P1 symbol detector. The correlation module 200 is configured to generate a correlation metric that indicates when an input signal x[n] comprises a P1 symbol. Specifically, the correlation module 200 is configured such that when the input signal x[n] comprises a P1 symbol there will be a peak in the correlation metric. In this example, the input signal x[n] is a digital representation of the received radio frequency (RF) DVB-T2 signal. Specifically, the input signal x[n] is a complex digital signal comprising a series of I/Q samples generated by a tuner of the receiver. As is known to those of skill in the art, each I/Q sample comprises an in-phase (I) component and a quadrature (Q) component which can be treated as the real and imaginary components of a complex number. However, it will be evident to a person of skill in the art that this is an example only and that the input signal may be represented in a different form.

In this example the correlation module 200 generates the correlation metric by generating a down-converted version of the input signal $x_{DC}[n]$ in which the frequency shift of $f_{sh}$ in parts C 110 and B 114 has been removed; and performing two correlations between the input signal x[n] and the down-converted version of the input signal $x_{DC}[n]$. The first correlation is performed between the input signal x[n] and the down-converted version of the input signal $x_{DC}[n]$ such that the first portion A1 116 of part A 112 of the input signal x[n] is correlated or compared with part C 110 of the down-converted version of the input signal. The second correlation is performed between the input signal x[n] and the down-converted version of the input signal $x_{DC}[n]$ such that the second portion A2 118 of part A 112 of the input signal x[n] is correlated or compared with part B 114 of the down-converted version of the input signal $x_{DC}[n]$. When the input signal comprises a P1 symbol, the first portion A1 116 of part A 112 of the input signal will match part C of the down-converted version of the input signal which will produce a peak in the output of the first correlation, and the second portion A2 118 of part A 112 of the input signal will match part B 114 of the down-converted version of the input signal which will produce a peak in the output of the second correlation. A P1 symbol can then be detected when there are peaks in the outputs of the first and second auto-correlations.

The example correlation module 200 of FIG. 2 comprises a down-converter 202, a first correlator 204, a second correlator 206 and a combination module 208.

The down-converter 202 is configured to generate the down-converted version of the input signal $x_{DC}[n]$ in which the frequency shift of $f_{sh}$ in parts C 110 and B 114 of the down-converted version of the input signal has been removed. Specifically, as described above with respect to FIG. 1, a P1 symbol 104 comprises three parts—C 110, A 112 and B 114 wherein part C 110, which precedes part A 112, is an up-converted (by frequency $f_{sh}$) version of the first portion A1 116 of part A 112; and part B 114, which follows part A 112, is an upconverted (by frequency $f_{sh}$) version of the second portion A2 118 of part A 112. In other words, parts C 110 and B 114 are up-converted repetitions of portions of part A 112. In most cases, parts C 110 and B 114 are up-converted by one P1 sub-carrier in the frequency domain. The down-converter 202 is configured to down-convert the input-signal by $f_{sh}$. For example, where parts C 110 and B 114 of a P1 symbol are generated by up-converting the first and second portions A1 116 and A2 118 of part A 112 of the P1 symbol by one P1 sub-carrier, the down-converter 202 is configured to down-convert the input signal x[n] by one P1 sub-carrier. Where the input signal is a series of I/Q values, the down-converter 202 may be configured to multiply the input signal x[n] with a complex sinusoidal signal (i.e.

$$e^{-j\frac{2\pi \cdot n}{N_A}}$$

where $N_A$ is the number of samples in part A 112 of a P1 symbol) to generate the down-converted version of the input signal $x_{DC}[n]$.

Figure 3:
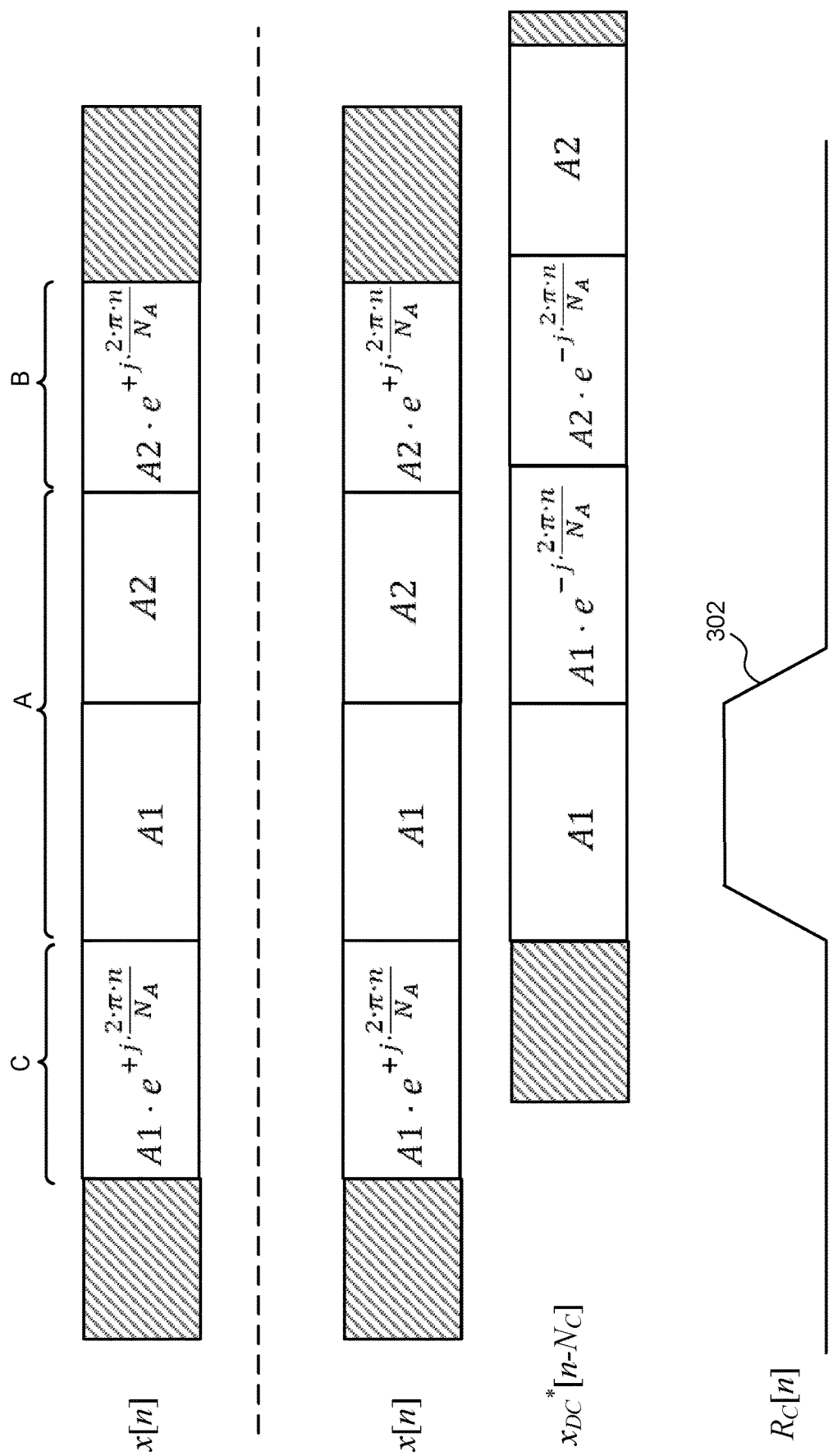
FIG. 3 is a schematic diagram illustrating the inputs to the first multiplier of the correlation module of FIG. 2 when the input signal comprises a P1 symbol.
Figure 4:
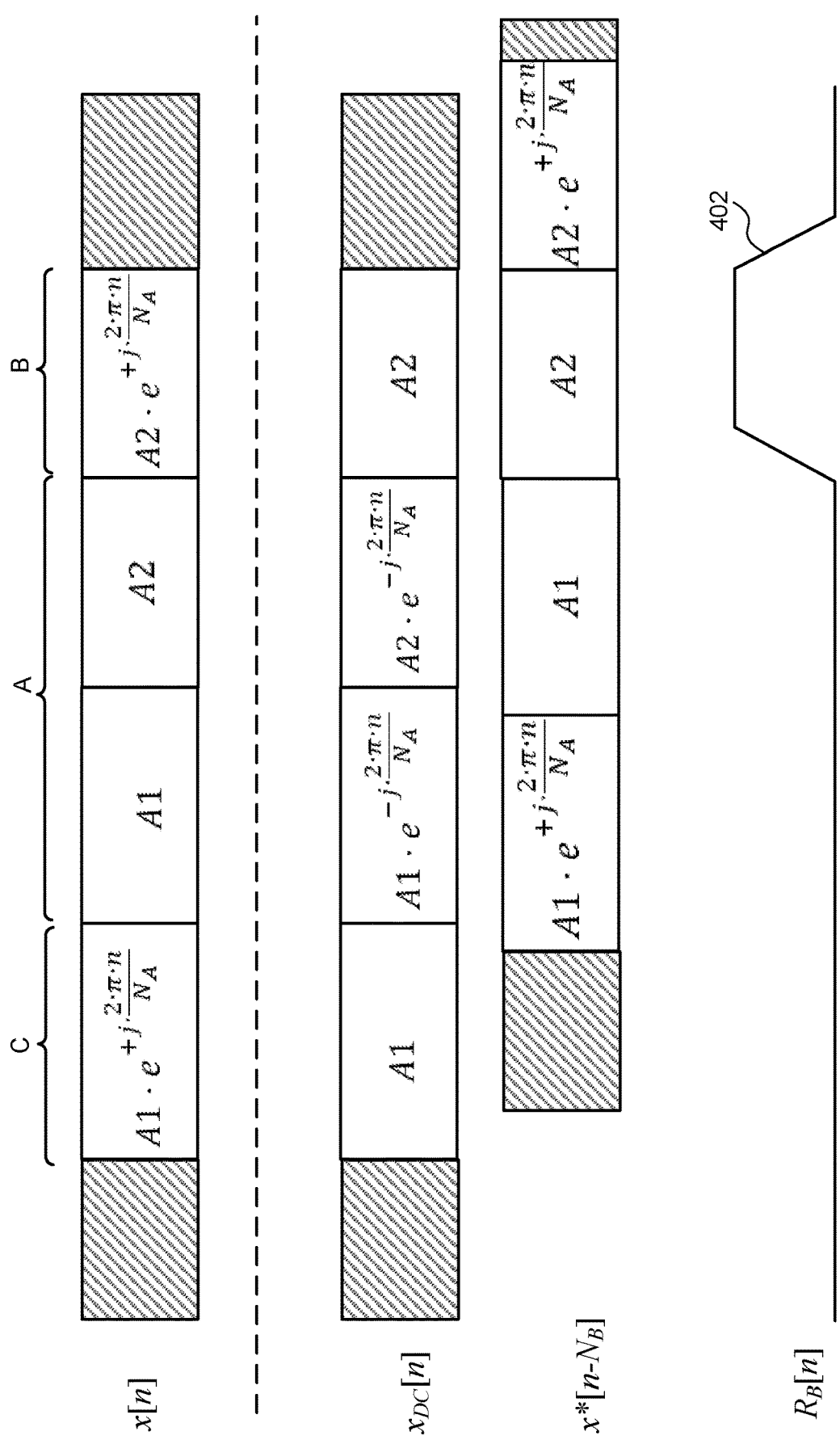
FIG. 4 is a schematic diagram illustrating the inputs to the second multiplier of the correlation module of FIG. 2 when the input signal comprises a P1 symbol.

As shown in FIGS. 3 and 4, when the input signal comprises a P1 symbol, part C 110 of the down-converted version of the input-signal $x_{DC}[n]$ will comprise a copy of the first portion A1 116 of part A 112 of the input signal (i.e. without the frequency shift) and part B of the down-converted version of the input signal $x_{DC}[n]$ will comprise a copy of the second portion A2 118 of part A 112 of the input signal (i.e. without the frequency shift).

The first correlator 204 is configured to correlate the input signal and the down-converted version of the input signal $x_{DC}[n]$ to generate a first correlation output $R_C[n]$ which indicates whether the first portion A1 116 of part A 112 of the input signal x[n] and part C 110 of the input signal x[n] have the expected relationship (i.e. that part C 110 of the input signal x[n] is an up-converted version of the first portion A1 116 of part A 112 of the input signal x[n]). Accordingly, the first correlator 204 may be referred to as the 'C' correlator and the first correlation output $R_C[n]$ may be referred to as the 'C' correlation output.

In the example shown in FIG. 2, the first correlator 204 comprises a first delay module 210, a first complex conjugate module 212, a first multiplier 214, a first low pass filter 216 and an absolute value module 217. The first delay module 210 receives the down-converted version of the input signal $x_{DC}[n]$ and applies a delay of $N_C$ samples to the received signal to generate a down-converted and delayed version of the input signal $x_{DC}[n-N_C]$, wherein $N_C$ is the number of samples in part C 110 of a P1 symbol. This results in the first portion A1 116 of part A 112 of the input signal x[n] being aligned with part C of the down-converted and delayed version of the input signal $x_{DC}[n-N_C]$.

The first complex conjugate module 212 then receives the down-converted and delayed version of the input signal $x_{DC}[n-N_C]$ and performs a complex conjugate operation on the received signal to generate a complex conjugated down-converted and delayed version of the input signal $x_{DC}^*[n-N_C]$. As is known to those of skill in the art, the complex conjugate of a complex number is the number with an equal real part and an imaginary part equal in magnitude, but opposite in sign.

The first multiplier 214 then multiplies the input signal x[n] and the complex conjugated down-converted and delayed version of the input signal $x_{DC}*[n-N_C]$. The output of the first multiplier 214 is then passed through the first low pass filter (LPF) 216 and an absolute value module 217 to generate the first correlation output $R_C[n]$. It will be evident to a person of skill in the art that this is an example implementation of the first correlator 204 and in other examples the first correlator 204 may be implemented in another manner.

For example, in other examples the first correlator 204 may not comprise the first complex conjugate module 212. Without the complex conjugate module 212 the correlation peaks at the input of the low pass filter 216 will be complex numbers with a strong absolute value, but a rapid varying angle. This means the low-pass filtering of these complex correlation peaks by the low-pass filter 216 accumulates strong absolute values with different values, which results in a small accumulated value. If, instead the complex conjugate is used, the correlation peaks become real numbers, which after low-pass filtering by the low pass filter 216 results in strong accumulated values.

Reference is now made to FIG. 3 which shows an example of the signals input to the first multiplier 214 and the resulting first correlation output $R_C[n]$ when the input signal comprises a P1 symbol. It can be seen from FIG. 3 that when the input signal comprises a P1 symbol part C 1110 of the complex conjugated down-converted and delayed version of the input signal $x_{DC}*[n-N_C]$ will comprise a copy of the first portion A1 116 of part A 112 of the input signal (i.e. without the frequency shift) and will be aligned with the first portion A1 116 of part A 112 of the input signal. The multiplication of these signals will result in a first correlation output $R_C[n]$ whose magnitude comprises a peak or pulse 302. In a "clean" channel, the peak is in the form of a trapezoidal pulse 302 as shown in FIG. 3, but in a noisy channel, the peak may take on another shape.

Returning to FIG. 2, the second correlator 206 is configured to correlate the input signal x[n] and the down-converted version of the input signal $x_{DC}[n]$ to generate a second correlation output $R_B[n]$ which indicates whether the second portion A2 118 of part A 112, and part B 114 of the input signal have an expected relationship (i.e. that part B 114 of the input signal is an up-converted version of the second portion A2 118 of part A 112 of the input signal). Accordingly, the second correlator 206 may be referred to as the 'B' correlator and the second correlation output $R_B[n]$ may be referred to as the 'B' correlation output.

In the example shown in FIG. 2 the second correlator 206 comprises a second delay module 218, a second complex conjugate module 220, a second multiplier 222, a second low pass filter 224 and an absolute value module 225. The second delay module 218 receives the input signal x[n] and applies a delay of $N_B$ samples to the received signal to generate a delayed version of the input signal $x[n-N_B]$, wherein $N_B$ is the number of samples in part B 114 of a P1 symbol. This results in the second portion A2 118 of part A 112 of the delayed version of the input signal $x_{Dc}[n-N_B]$ being aligned with part B 114 of the down-converted input signal $x_{Dc}[n]$.

The second complex-conjugate module 220 then receives the delayed version of the input signal $x[n-N_B]$ and performs a complex conjugate operation on the received signal to generate a complex conjugated and delayed version of the input signal $x*[n-N_B]$. As is known to those of skill in the art the complex conjugate of a complex number is the number with an equal real part and an imaginary part equal in magnitude, but opposite in sign.

The second multiplier 222 then multiplies the complex conjugated and delayed version of the input signal $x*[n-N_B]$ and the down-converted version of the input signal $x_{DC}[n]$. The output of the second multiplier 222 is then passed through the second low pass filter 224 and an absolute value module 225 to generate the second correlation output $R_B[n]$. It will be evident to a person of skill in the art that this is an example implementation of the second correlator 206 and that in other examples, the second correlator 206 may be implemented in another manner. For example, in other examples the second correlator 206 may not comprise a complex-conjugate module.

Reference is now made to FIG. 4 which shows an example of the signals input to the second multiplier 222 and the resulting second correlation output $R_B[n]$ when the input signal comprises a P1 symbol. It can be seen from FIG. 4 that when the input signal x[n] comprises a P1 symbol, part B 114 of the down-converted version of the input signal $x_{DC}[n]$ will comprise a copy of the second portion A2 118 of part A 112 of the input signal (i.e. without the frequency shift) and will be aligned with the second portion A2 118 of part A 112 of the complex conjugated and delayed version of the input signal $x*[n-N_B]$. The multiplication of these signals will result in a second correlation output $R_B[n]$ whose magnitude comprises a peak or pulse 402. In a "clean" channel, the peak is in the form of a trapezoidal pulse 402 as shown in FIG. 4, but in a noisy channel, the peak may take on another shape.

Referring back to FIG. 2, the combination module 208 is configured to combine the first and second correlation outputs $R_C[n]$ and $R_B[n]$ to generate a correlation metric R[n]. In some cases, the combination module 208 may be configured to align the first and second correlation outputs and then multiply the aligned correlation outputs to generate the correlation metric R[n]. For example, the combination module 208 of FIG. 2 comprises a third delay module 226 and a third multiplier 228. The third delay module 226 receives the first correlation output $R_C[n]$ and applies a delay of $N_A$ samples to the received signal to generate a delayed version of the first correlation output $R_C[n-N_A]$, wherein $N_A$ is the number of samples in part A 112 of a P1 symbol (e.g. 1024 samples according to the DVB-T2 standard). Where the first and second correlation outputs comprise pulses 302 and 402 as shown in FIGS. 3 and 4, this results in the pulse 402 of the second correlation output being aligned with the pulse 302 of the delayed version of the first correlation output. The third multiplier 228 multiplies the delayed version of the first correlation output and the second correlation output to generate the correlation metric R[n].

Figure 5:
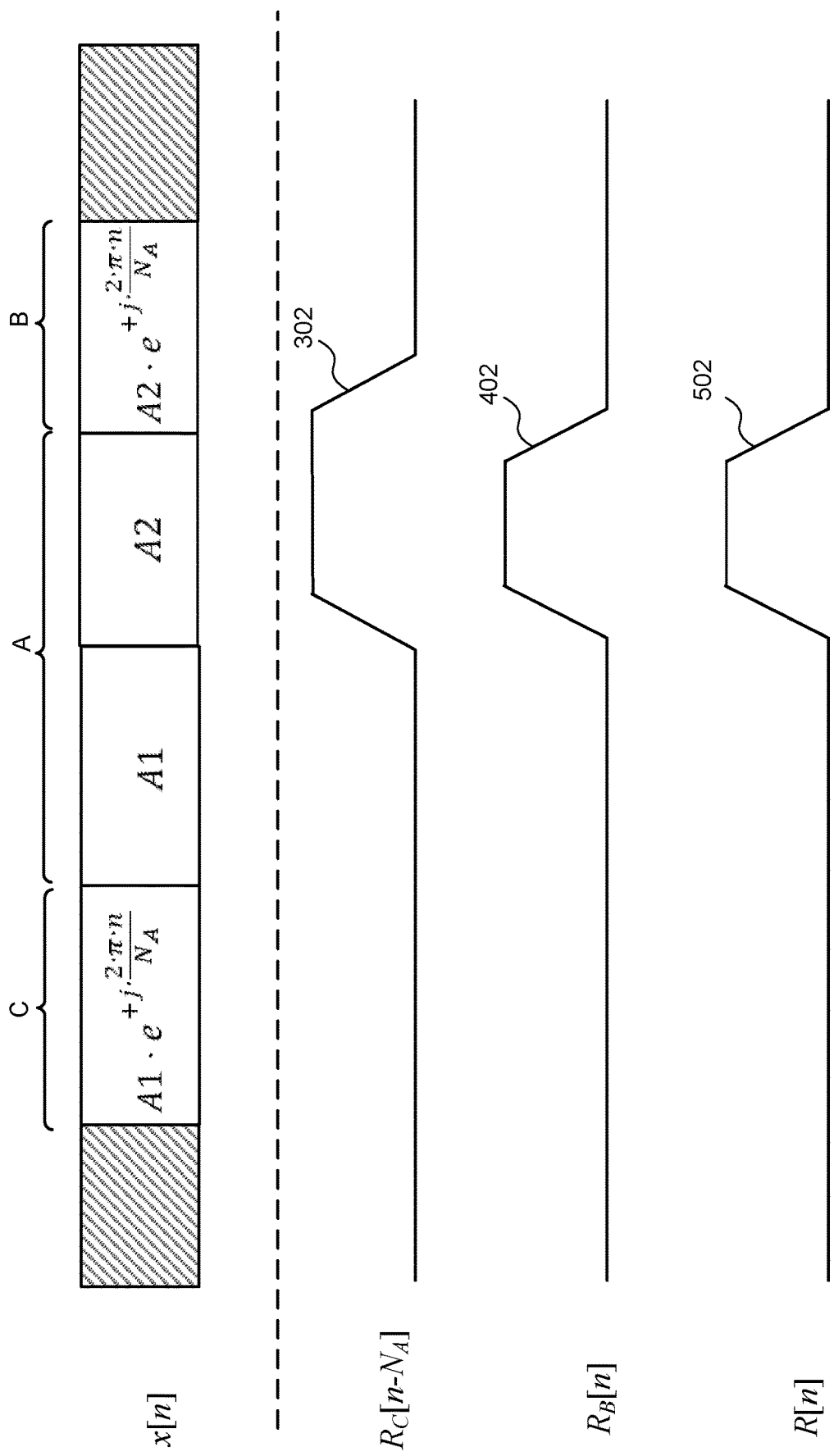
FIG. 5 is a schematic diagram illustrating the inputs to the third multiplier of the correlation module of FIG. 2 when the input signal comprises a P1 symbol.

Reference is now made to FIG. 5 which shows an example of the signals input to the third multiplier 228 and the resulting correlation metric R[n] when the input signal x[n] comprises a P1 symbol. It can be seen from FIG. 5 that when the input signal x[n] comprises a P1 signal, the pulse 302 of the time-delayed version of the first correlation output and the pulse 402 of the second correlation output will be aligned which, when multiplied, results in a pulse 502 in the magnitude of the correlation metric R[n]. The presence of a P1 symbol in the input signal may then be detected by comparing the magnitude of the correlation metric |R[n]| to a predetermined threshold. For example, the presence of a P1 symbol in the input signal may be detected when the magnitude of the correlation metric R[n] exceeds the predetermined threshold.

Referring back to FIG. 2, the correlation module 200 of FIG. 2 performs a series of two correlation calculations, which can apply a change in the correlation metric magnitude to the power of four. Proper monitoring and adjustment of the signal amplitude at the input of the correlators 204, 206, by means of an automated gain, can ensure the values throughout the calculations are well within the dynamic range of the arithmetic unit used. However, in the event of fast variations on the power of the input signal, some intermediate results of the correlators 204, 206 may be driven into saturation or to zero and, hence, impair the performance of the correlation module. To avoid this problem, either the dynamic range of the calculations may be increased to accommodate for the maximum expected signal variations, or the power variation has to be taken into account in the correlation calculations. The first approach can be achieved by, for instance, increasing the number of bits used to represent the values in the calculations or by converting these values from the linear to the logarithmic domain. The second approach requires monitoring the power of the input signal at regular intervals (e.g. via power monitoring component 230) and scaling the first and second correlation metrics (e.g. via amplifiers 232, 234) to keep the first and second correlation outputs within the dynamic range of the combination module 208.

Known P1 detectors which comprise only a single correlation module, such as the correlation module 200 of FIG. 2, that compares the input signal to a down-converted version of itself have limitations which impair the ability of the P1 detector to reliably detect P1 symbols in the input signal. Firstly, such P1 detectors are very sensitive to the power of the input signal. Specifically, sufficiently fast variations in the magnitude of the input signal will cause similar variations in the correlation metric R[n] generated by the correlation module 200 which may result in the P1 symbol detector falsely detecting a P1 symbol in the input signal.

Secondly, such P1 detectors cannot correctly identify P1 symbols when the input signal x[n] (i.e. the input signal received at the P1 detector) has an inverted spectrum. As is known to those of skill in the art a first signal has an inverted spectrum with respect to a second signal if the frequency components have a reversed order with respect to the centre frequency and the spectrum of the first signal is the complex conjugate of the spectrum of the other signal.

Figure 6:
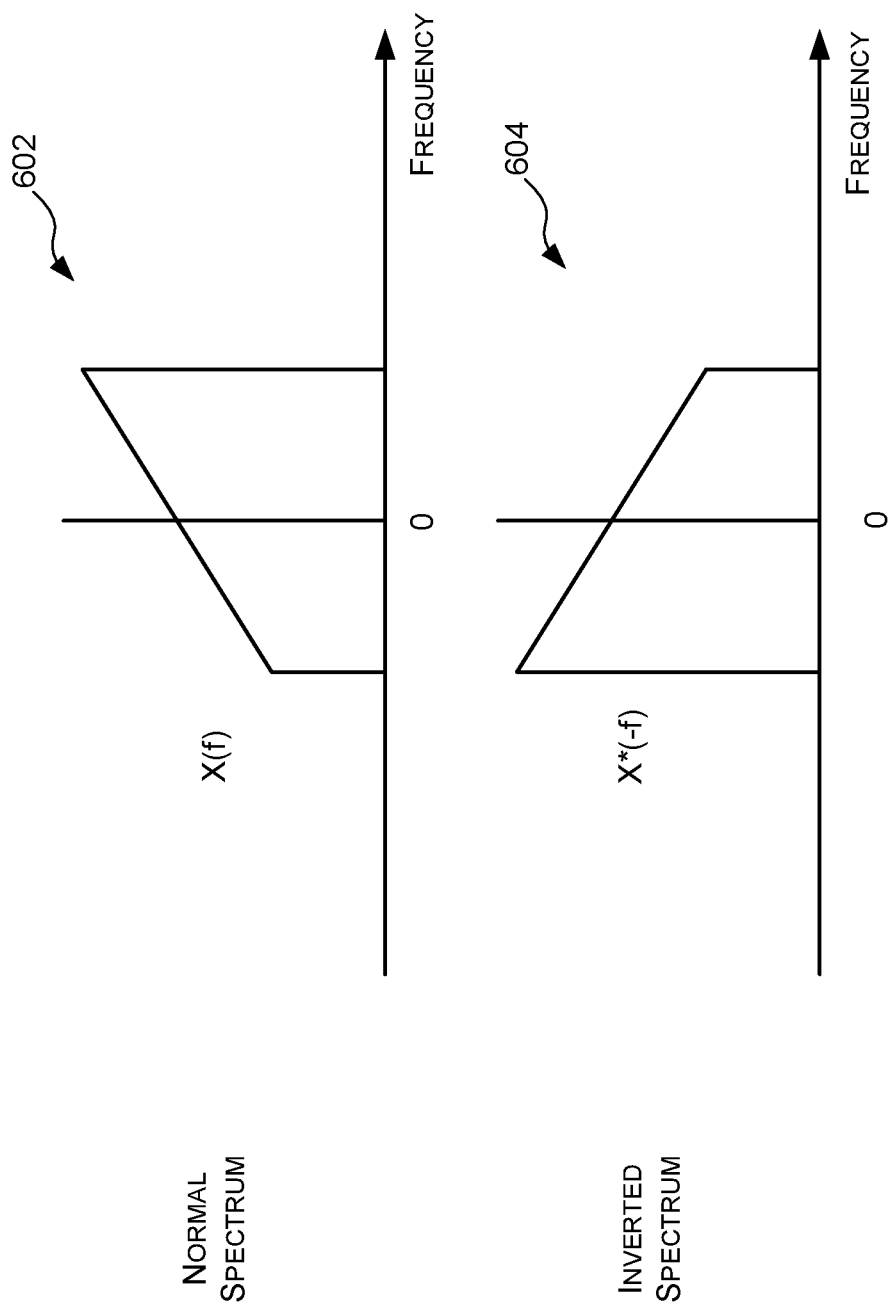
FIG. 6 is a schematic diagram illustrating a normal spectrum and an inverted spectrum.

Reference is now made to FIG. 6 which illustrates a normal spectrum 602 and an inverted spectrum 604 thereof. When an inverted spectrum occurs at baseband as shown in FIG. 6, all the frequencies in the baseband signal will have an inverted sign so that frequencies that were positive will be negative and the frequencies that were negative will be positive. For example, a component that was at +15 MHz in the original signal will be at −15 MHz and complex conjugated in a signal with an inverted spectrum. Spectral inversion happens when the in-phase and quadrature components of a signal are reversed. This may occur during the mixing process.

For example, a DVB-T2 receiver typically comprises a tuner that receives a signal in a first frequency band (e.g. RF) and down-converts the received signal to a second frequency band (e.g. to an IF or baseband) for processing. DVB-T2 tuners are typically configured to down-convert the received RF signal by multiplying or mixing the received RF signal with a pair of sinusoids (with a phase difference of 90 degrees between them) which, after low-pass filtering to remove the up-conversion results, produces two down-converted signals, one corresponding to the in-phase (I) component of the received RF signal and another corresponding to the quadrature (Q) component of the received RF signal. These two signals can be represented in the form of one complex signal given by $x(t)=I(t)-jQ(t)$ with a Fourier transform $X(f)$. Depending on the implementation of the tuner, the in-phase and quadrature components may be swapped at the receiver tuner output and so, the complex signal is given by $x_f(t)=Q(t)-jI(t)$. In this case, the spectrum of the complex signal is given by $X_f(f)=j \cdot X^*(-f)$ and the signal is said to have an inverted spectrum.

If a signal with an inverted spectrum is provided to a P1 detector that comprises a single correlation module, such as the correlation module 200 FIG. 2, that correlates the input signal with a down-converted version of itself, the P1 detector will not be able to detect P1 symbols in the input signal. Specifically, in an input signal with an inverted spectrum, the frequency shift in parts C 110 and B 114 of a P1 symbol will have the opposite sign, therefore down-converting the input signal by $f_{sh}$ will not generate a version of the input signal in which the frequency shift in the parts C 110 and B 114 has been removed—instead the down-conversion will have the opposite effect—it will generate a version of the input signal in which parts C 110 and B 114 thereof have twice the frequency shift. Parts C 110 and B 114 of the down-converted version of the input signal will therefore be even further away from the corresponding portions A1 116 and A2 118 of part A 112 of the input signal. This means that the correlation of the down-converted signal and the input signal will not result in clear pulses in the first and second correlation outputs.

Accordingly, described herein are improved P1 symbol detectors that comprise two correlation modules and a comparison module. The first correlation module (which may be referred to as the normal correlation module) is configured to generate a correlation metric that will indicate whether an input signal with a normal spectrum comprises a P1 symbol. Specifically, the first correlation module is configured to perform one or more first correlations between the input signal and a down-converted version of the input signal and generate a first correlation metric from the one or more first correlations. The second correlation module (which may be referred to as the inverted correlation module) is configured to generate a correlation metric that will indicate whether an input signal with an inverted spectrum comprises a P1 symbol. Specifically, the second correlation module is configured to perform one or more second correlations between the input signal and an up-converted version of the input signal and generate a second correlation metric from the one or more second correlations. The comparison module is configured to determine whether a P1 symbol is present in the input signal based on a comparison of the first and second correlation metrics.

A P1 symbol detector that comprises a first correlation module that generates a correlation metric that indicates whether input signal with a normal spectrum comprises a P1 symbol, and a second correlation module that generates a correlation metric that indicates whether an input signal with an inverted spectrum comprises a P1 symbol, not only allows the P1 symbol detector to detect P1 symbols in input signals with an inverted spectrum, but allows the P1 symbol detector to reduce the number of false positives that occur due to spikes or rapid variations in the amplitude of the input signal. This is because a spike or sufficiently rapid variation in amplitude in the input signal that may incorrectly be detected as a P1 symbol will have the same effect on both correlation modules causing them both to produce correlation metrics that have a peak. In contrast, when there is a true P1 symbol, only one of the correlation modules will produce a correlation metric with a significant peak. Accordingly, the P1 symbol detector can distinguish between a power spike or other rapid variation in the power of the input signal, and an actual P1 symbol based on whether both or only one of the correlation metrics indicate that the input signal comprises a P1 symbol.

Reducing the number of false positives (e.g. caused by power spikes or variations) and the number of false negatives (e.g. caused by the input signal have an inverted spectrum) increases the confidence downstream components have in the output of the P1 symbol detector which can have implications on how long it takes a DVB-T2 receiver to lock on to a DVB-T2 signal. For example, in some cases it may speed up the time for a DVB-T2 receiver to acquire a DVB-T2 signal.

Figure 7:
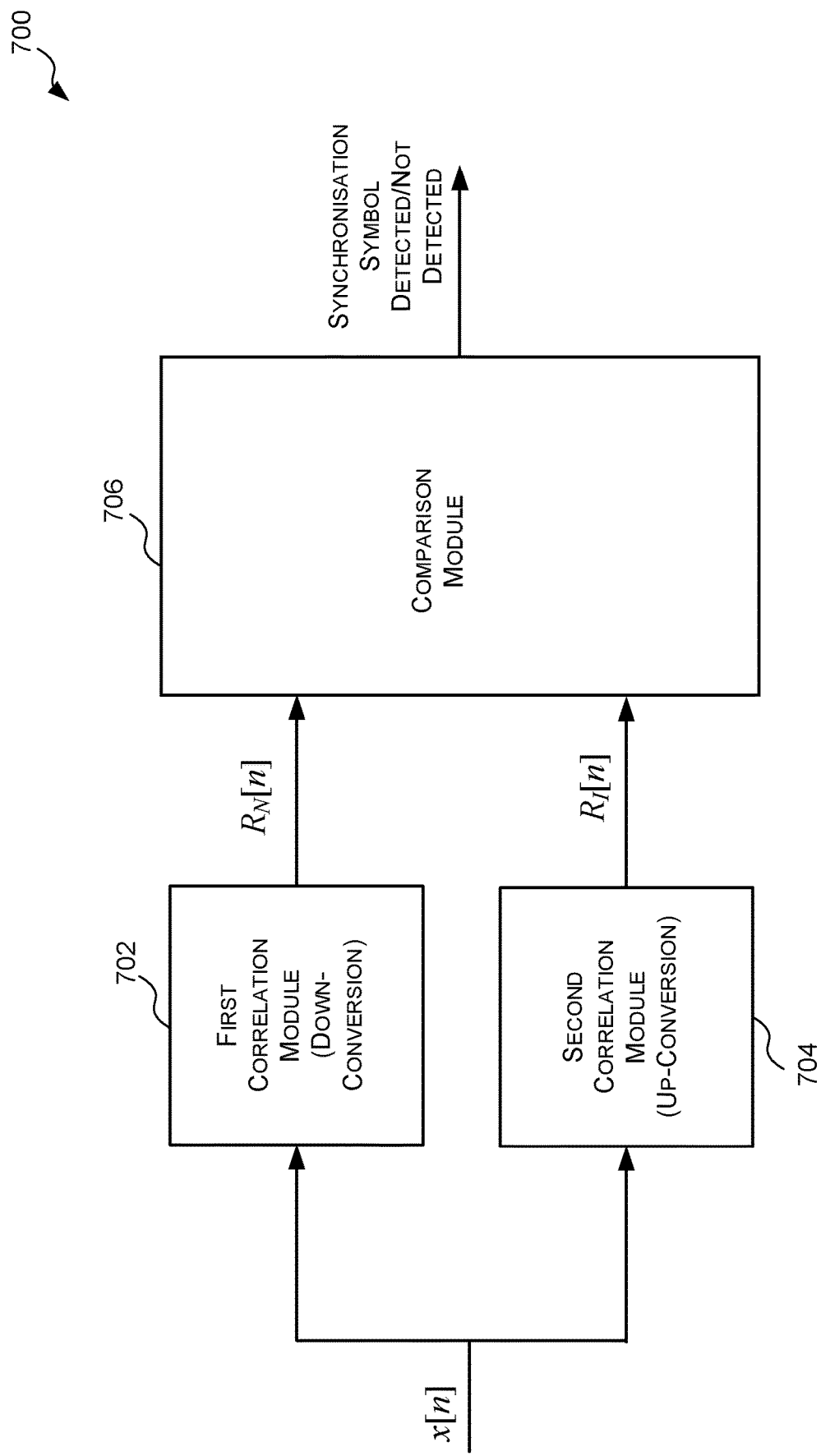
FIG. 7 is a block diagram of an example P1 symbol detector comprising first and second correlation modules.

Reference is now made to FIG. 7 which illustrates an example P1 symbol detector 700 in accordance with an embodiment. The P1 symbol detector 700 comprises a first correlation module 702, a second correlation module 704 and a comparison module 706.

The first P1 correlation module 702 (which may also be referred to as the normal correlation module) is configured to generate a first correlation metric $R_N[n]$ that will have a peak when the input signal x[n] comprises a P1 symbol and the input signal x[n] has a normal spectrum by performing one or more auto-correlations on the input signal x[n]. Specifically, the first correlation module 702 is configured to perform one or more correlations between the input signal x[n] and a down-converted version of the input signal $x_{DC}[n]$ and to generate the first correlation metric $R_N[n]$ (which may be referred to as the normal correlation metric) based on the one or more correlations.

As described above, when the input signal x[n] has a normal or expected spectrum, down-converting the input signal x[n] by $f_{sh}$ generates a down-converted version of the input signal wherein, when the input signal comprises a P1 symbol, parts C 110 and B 114 of the down-converted signal will match the first and second portions A1 116 and A2 118 of part A 112 of the input signal respectively. In other words, the down-conversion removes the frequency shift in parts C 110 and B 114 of the down-converted version of the input signal. This allows a P1 symbol to be detected by comparing the first portion A1 116 of part A 112 of the input signal and part C 110 of the down-converted version of the input signal; and, by comparing the second portion A2 118 of part A 112 of the input signal and part B 114 of the down-converted version of the input signal.

In some cases, the first correlation module 702 may be implemented as the correlation module 200 FIG. 2. However, it will be evident to a person of skill in the art that this is an example only and that the first correlation module 702 may take any suitable form.

The second correlation module 704 (which may also be referred to as the inverted correlation module) is configured to generate a second correlation metric $R_I[n]$ (which may be referred to as the inverted correlation metric) that will have a peak when the input signal comprises a P1 symbol and the input signal has an inverted spectrum. Specifically, the second correlation module 704 is configured to perform one or more correlations between the input signal x[n] and an up-converted version of the input signal $x_{UC}[n]$ and to generate the first correlation metric $R_I[n]$ based on the one or more correlations.

As described above, when the input signal x[n] has an inverted spectrum, down-converting the signal by $f_{sh}$ does not generate a down-converted version of the signal wherein parts C and B of the down-converted signal match the first and second portions A1 and A2 of part A of the input signal. This is because when the input signal has an inverted spectrum the frequencies in the input signal will have an inverted sign thus down-converting the signal by $f_{sh}$ will effectively double the frequency shift in parts C and B of the down-converted version of the input signal. Accordingly, to generate a version of the input signal wherein parts C and B thereof match the first and second portions A1 and A2 of part A of the input signal, the input signal is up-converted by the frequency shift. In other words, the sign of the exponent used to drive the frequency shifter is inverted with respect to the first correlation module.

An example implementation of the second correlation module 704 is described below with reference to FIG. 8. However, it will be evident to a person of skill in the art that this is an example only and that the second correlation module 704 may take any suitable form.

The comparison module 706 is configured to compare the first and second correlation metrics $R_N[n]$ and $R_I[n]$ generated by the first and second correlation modules 702 and 704 and detect a P1 symbol in the input signal based on the comparison. Specifically, when the input signal x[n] comprises a P1 symbol then either the first correlation metric $R_N[n]$ or the second correlation metric $R_I[n]$ will indicate that the input signal comprises a P1 symbol, but not both). In particular, when the input signal x[n] comprises a P1 symbol and the input signal has a normal or expected spectrum then the first correlation metric $R_N[n]$ will indicate the input signal comprises a P1 symbol (i.e. it will have a peak) and the second correlation metric $R_I[n]$ will not indicate that the input signal comprises a P1 symbol (i.e. it will not have a peak); and when the input signal comprises a P1 symbol and the input signal has an inverted spectrum the second correlation metric $R_I[n]$ will indicate the input signal comprises P1 symbol (i.e. it will have a peak) and the first correlation metric $R_N[n]$ will not indicate the input signal comprises a P1 symbol (i.e. it will not have a peak). However, if there is a spike or other variation in the power of the input signal caused by, for example, interference, then both the first and second correlation metrics $R_N[n]$ and $R_I[n]$ will indicate that the input signal comprises a P1 symbol. Accordingly, the comparison module 706 may be configured to detect a P1 symbol in the input signal when only one of the first and second correlation metrics $R_N[n]$ and $R_I[n]$ indicate the input signal comprises a P1 symbol.

In some cases, the comparison module 706 may be configured to generate a joint metric based on the first and second correlation metrics $R_N[n]$ and $R_I[n]$ and detect a P1 symbol in the input signal based on a comparison of the joint metric and a decision threshold. The joint metric may be configured to indicate the similarity of the first and second correlation metrics. For example, the first and second correlation metrics $R_N[n]$ and $R_I[n]$ will typically comprise a plurality of values and the joint metric may be the ratio $$\frac{\mu_N}{\mu_I}$$

of the mean or average of the first correlation metric $\mu_N$ and the mean or average of the second correlation metric $\mu_I$. In this case, the joint metric $$\frac{\mu_N}{\mu_I}$$

may be close to 1 when the first and second correlation metrics are similar and may be further from 1 when the first and second correlation metrics $R_N[n]$ and $R_I[n]$ are dissimilar. Accordingly, the comparison module 706 may be configured to determine that the input signal comprises a P1 symbol when the first and second correlation metrics are sufficiently dissimilar (e.g. sufficiently far from 1). For example, the comparison module 706 may be configured to determine that the first and second correlation metrics are sufficiently dissimilar if the joint metric $$\frac{\mu_N}{\mu_I}$$

is greater than a predetermined decision threshold θ or if the joint metric $$\frac{\mu_N}{\mu_I}$$

is less than the inverse of the predetermined decision threshold 1/θ. In some examples the decision threshold θ may be equal to 8.

In some cases, in addition to determining whether the input signal comprises a P1 symbol, the comparison module 706 may also be configured to determine whether the input signal has a normal or expected spectrum or an inverted spectrum based on the first and second correlation metrics $R_N[n]$ and $R_I[n]$. For example, the comparison module 706 may be configured to determine that the input signal has a normal or expected spectrum when the first correlation metric $R_N[n]$ indicates the input signal comprises a P1 symbol and the second correlation metric $R_I[n]$ does not indicate that the input signal comprises a P1 symbol; and determine that the input signal has an inverted spectrum when the second correlation metric $R_I[n]$ indicates the input signal comprises a P1 symbol and the first correlation metric $R_N[n]$ does not indicate that the input signal comprises a P1 symbol.

In some cases, the comparison module 706 may be configured to determine that the input signal has a normal spectrum when the joint metric (e.g. the ratio of averages) is greater than the decision threshold; and may be configured to determine that the input signal has an inverted spectrum when the joint metric (e.g. the ratio of averages) is less than the inverse of the decision threshold. The determination of whether the input signal has a normal or inverted spectrum can be provided to downstream components of the receiver so that they can select the correct down-converted component for processing.

In some cases, in addition to determining whether the input signal comprises a P1 symbol, the comparison module 706 may also be configured to, in response to determining that the input signal comprises a P1 symbol, estimate the time-position of the P1 symbol based on the first and second correlation metrics. In some examples, the comparison module 706 may be configured to estimate the time-position of the P1 symbol from $R_Z[n]$ as shown in equation (1):

$$R_Z[n] = \frac{R_N[n] + Z}{R_I[n] + Z} \tag{1}$$

wherein Z is given by equation (2):

$$Z = \frac{\max(\max(R_N[n])\max(R_I[n]))}{2^K - 1} \tag{2}$$

and K is a normalisation parameter, which configures the magnitude of the correlation peak. The time position $n_p$ of the P1 symbol is determined to be the sample of $R_Z[n]$ that exceeds a predetermined threshold as shown in equation (3):

$$n_p = \min(n|_{R[n] > K \cdot 85\%}) \tag{3}$$

Experimentation has shown that 85% of the maximum provides an estimate that is a good compromise between reliability of detection and estimation accuracy. In some cases, K may be equal to 5.0.

An example implementation of the comparison module 706 is described below with reference to FIG. 9.

Figure 8:
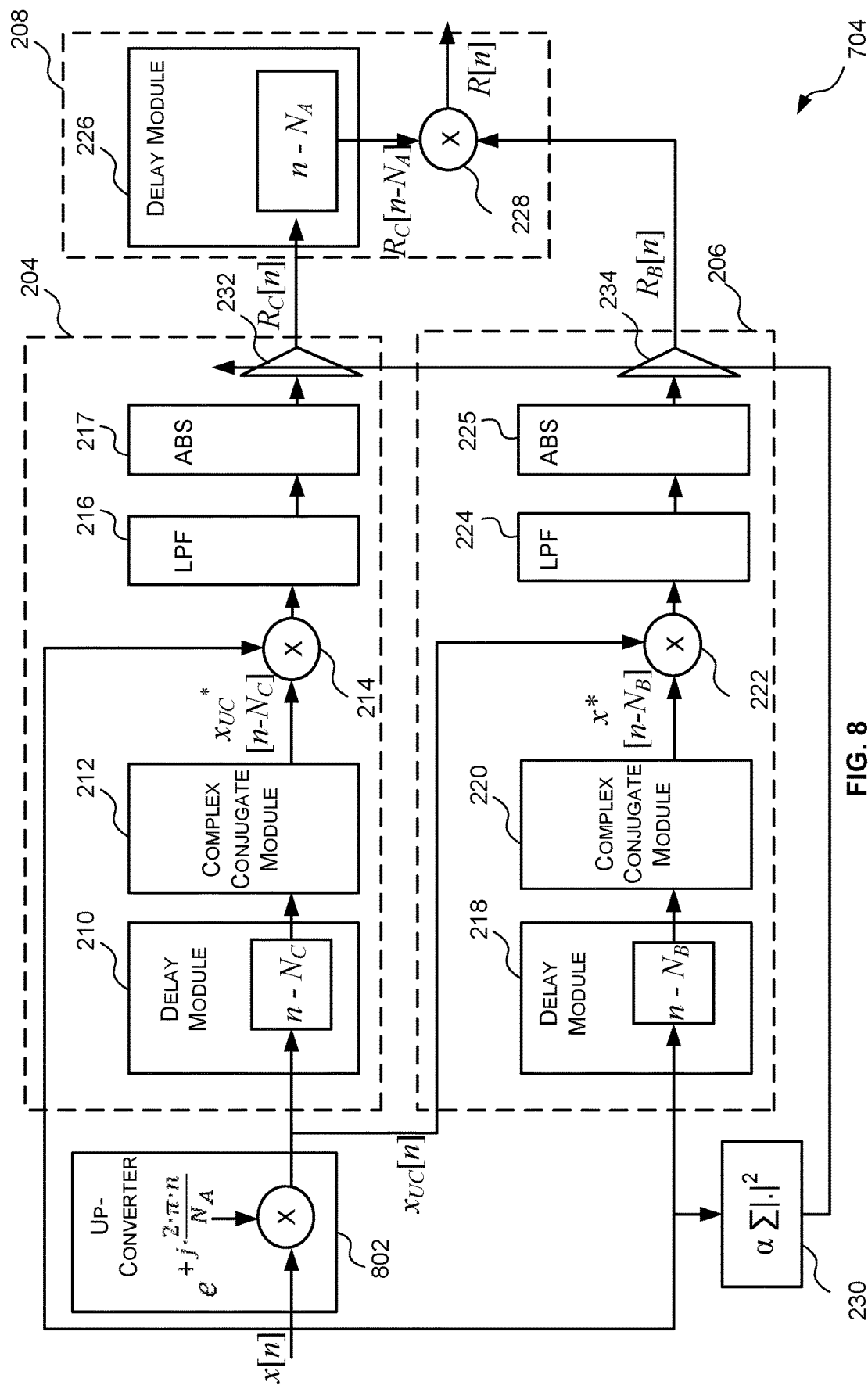
FIG. 8 is a block diagram of an example implementation of the second correlation module of the P1 symbol detector of FIG. 7.

Reference is now made to FIG. 8 which illustrates an example implementation of the second correlation module 704 of FIG. 7. The second correlation module 704 is configured to generate a second correlation metric which will have a peak when the input signal comprises a P1 symbol and has an inverted spectrum. This is in contrast to the first correlation module 702 which is configured to generate a first correlation metric which will have a peak when the input signal comprises a P1 symbol and has a normal or expected spectrum. The example second correlation module 704 of FIG. 8 is the same as the correlation module 200 of FIG. 2, except instead of comprising a down-converter 202 configured to generate a down-converted version of the input signal in which the frequency shift in parts C and B of the signal have been removed, the second correlation module 704 comprises an up-converter 802 that is configured to generate an up-converted version of the input signal in which the frequency shift in parts C and B thereof have been removed. As described above, the frequencies of an input signal with an inverted spectrum have an inverted sign compared to the frequencies of an input signal with a normal spectrum thus to remove the frequency shift in parts C and B of an input signal with an inverted spectrum the signal is up-converted (i.e. the frequency $f_{sh}$ is added to the frequencies).

In addition to the up-converter 802, the second correlation module 704 comprises a first correlator 204, a second correlator 206 and a combination module 208. The first correlator 204, second correlator 206 and the combination module 208 operate in the same manner as described above with respect to FIG. 2 except instead of the first and second correlators 204, 206 correlating the input signal x[n] and a down-converted version of the input signal $x_{DC}[n]$ to generate the first and second correlation outputs $R_C[n]$ and $R_B[n]$, the first and second correlators 204, 206 correlate the input signal x[n] and an up-converted version of the input signal $x_{UC}[n]$ to generate the first and second correlation outputs $R_C[n]$ and $R_B[n]$.

Figure 9:
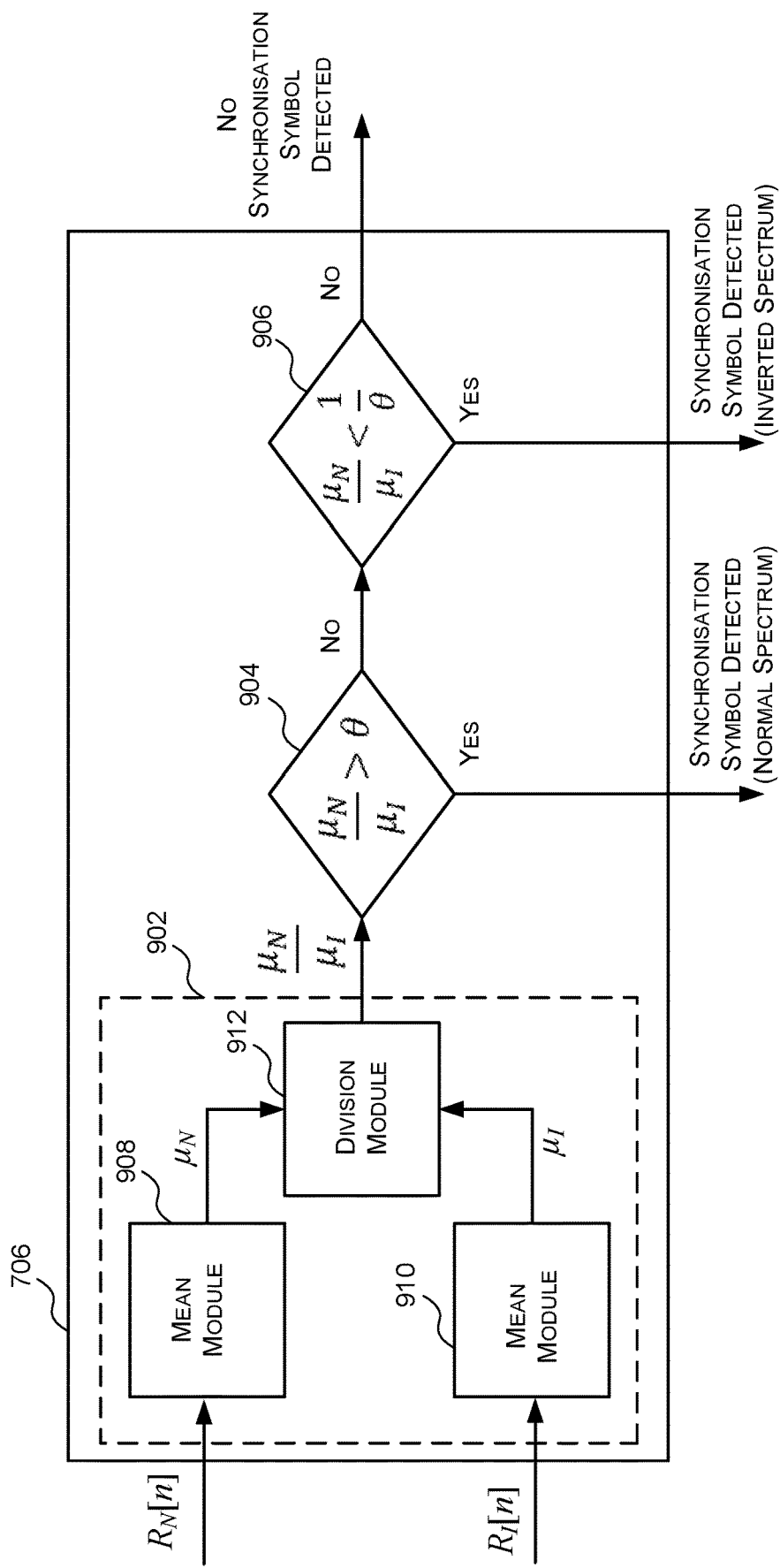
FIG. 9 is a block diagram of an example implementation of the comparison module of the P1 symbol detector of FIG. 7.

Reference is now made to FIG. 9 which illustrates an example implementation of the comparison module 706 of FIG. 7. The comparison module 706 of FIG. 9 comprises a joint metric module 902, a first decision module 904 and a second decision module 906.

The joint metric module 902 is configured to generate a joint metric based on the first and second correlation metrics $R_N[n]$ and $R_I[n]$ generated by the first and second correlation modules 702 and 704. In some cases, the joint metric is configured to indicate the similarity of the first and second correlation metrics $R_N[n]$ and $R_I[n]$. As described above, if the first and second correlation metrics $R_N[n]$ and $R_I[n]$ are sufficiently similar it indicates that there is no P1 symbol in the input signal x[n]. Specifically, if the first and second correlation metrics $R_N[n]$ and $R_I[n]$ are similar it indicates that either both correlation metrics indicate there is a P1 symbol in the input signal x[n], indicating a false detection, or that both correlation metrics do not indicate the input signal x[n] comprises a P1 symbol indicating there is no P1 symbol. In contrast, if the first and second correlation metrics are sufficiently dissimilar it indicates that there is a P1 symbol in the input signal x[n]. Specifically, if the first and second correlation metrics are sufficiently dissimilar it indicates that one of the metrics indicates that there is a P1 symbol in the input signal and the other correlation metric does not indicate there is a P1 symbol in the input signal.

In some cases, the joint metric may be a ratio of the means of the first and second correlation metrics $R_N[n]$ and $R_I[n]$. A ratio close to 1 would indicate that the first and second correlation metrics are similar and there is no P1 symbol in the input signal, and a ratio far from 1 would indicate that the first and second correlation metrics are dissimilar and thus there is a P1 symbol in the input signal.

For example, the joint metric module 902 of FIG. 9 comprises a first mean module 908 which is configured to calculate the mean or average $\mu_N$ of the first correlation metric $R_N[n]$, a second mean module 910 which is configured to calculate the mean or average $\mu_I$ of the second correlation metric $R_I[n]$ and a division module 912 which is configured to generate the joint metric as the ratio of the mean or average $\mu_N$ of the first correlation metric $R_N[n]$ and the mean or average $\mu_I$ of the second correlation metric $R_I[n]$ $$\left(\text{i.e. } \frac{\mu_N}{\mu_I}\right).$$

It will be evident to a person of skill in the art that this is an example only and that in other cases another joint metric may be generated. For example, in other cases the ratio may be the ratio of the mean of the second correlation metric to the mean of the first correlation metric $$\left(\text{i.e. } \frac{\mu_I}{\mu_N}\right).$$

The first decision module 904 is configured to determine, from the joint metric generated by the joint metric module 902, whether there is a P1 symbol in the input signal x[n] and the input signal x[n] has a normal spectrum. As described above, if the input signal x[n] has a normal spectrum then when the input signal comprises a P1 symbol then the first correlation metric $R_N[n]$ will indicate that the input signal comprises a P1 symbol and the second correlation metric $R_I[n]$ will not indicate that the input signal comprises a P1 symbol. Accordingly, the first decision module 904 may be configured to determine that there is a P1 symbol in the input signal and the input signal has a normal spectrum when the joint metric indicates that the first correlation metric indicates that the input signal comprises a P1 symbol and the second correlation metric does not indicate that the input signal comprises a P1 symbol.

Where the joint metric is a ratio $$\frac{\mu_N}{\mu_I}$$

of the means $\mu_N$, $\mu_I$ of the first and second correlation metrics $R_N[n]$ and $R_I[n]$ and a correlation metric will be high when the input signal comprises a P1 symbol, then the ratio will be high (i.e. >>1) when the first correlation metric indicates there is a P1 symbol in the input signal and the second correlation metric does not indicate there is a P1 symbol in the input signal. In these cases, the first decision module 904 may determine that there is a P1 symbol in the input signal and the input signal has a normal spectrum if the ratio is greater than a decision threshold θ. If the joint metric does not indicate that there is a P1 symbol in the input signal and the input signal has a normal spectrum then the joint metric is provided to the second decision module 906.

The second decision module 906 is configured to determine from the joint metric generated by the joint metric module 902 whether there is a P1 symbol in the input signal x[n] and the input signal x[n] has an inverted spectrum. As described above, if the input signal x[n] has an inverted spectrum then when the input signal x[n] comprises a P1 symbol then the first correlation metric $R_N[n]$ will not indicate that the input signal comprises a P1 symbol and the second correlation metric $R_I[n]$ will indicate that the input signal comprises a P1 symbol. Accordingly, the second decision module 906 may be configured to determine that there is a P1 symbol in the input signal and the input signal has an inverted spectrum when the joint metric indicates that the first correlation metric does not indicate the input signal comprises a P1 symbol and the second correlation metric does indicate that the input signal comprises a P1 symbol.

Where the joint metric is a ratio $$\frac{\mu_N}{\mu_I}$$

of the means $\mu_N$, $\mu_I$ of the first and second correlation metrics $R_N[n]$ and $R_I[n]$ and a correlation metric will be high to indicate the input signal comprises a P1 symbol, then the ratio will be low (i.e. <<1) when the first correlation metric does not indicate the input signal comprises a P1 symbol and the second correlation metric does indicate that the input signal comprises a P1 symbol. In these cases, the second decision module 906 may determine that there is a P1 symbol in the input signal and the input signal has an inverted spectrum if the ratio is less than the inverse of the decision threshold 1/θ. If the joint metric does not indicate that there is P1 symbol in the input signal, then the second decision module 906 determines there is no P1 symbol in the input signal and outputs information indicating that there is no P1 symbol.

Figure 10:
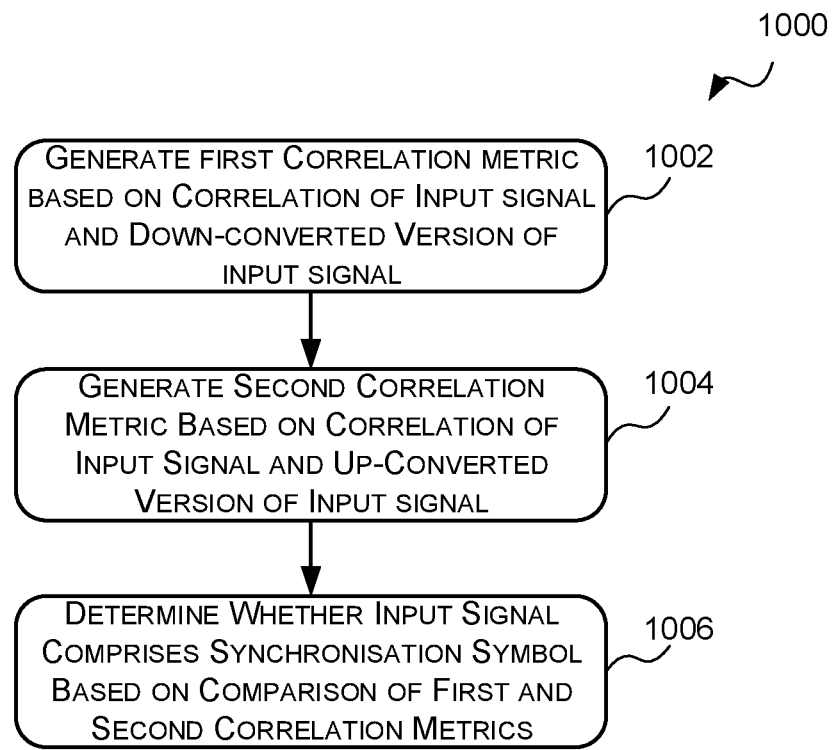
FIG. 10 is a flow diagram of an example method for detecting a P1 symbol in an input signal.

Reference is now made to FIG. 10 which illustrates an example method 1000 for detecting a P1 symbol in an input signal. The method 1000 begins at block 1002 where one or more first correlations are performed between the input signal and a down-converted version of the input signal and a first correlation metric is generated based on the one or more first correlations. As described above, the down-converted version of the input signal may be generated so that when the input signal has a normal spectrum the frequency shift in one or more portions of the input signal (e.g. parts C and B) have been removed in the down-converted version of the input signal. The one or more first correlations may comprise correlating the input signal and a time-shifted version of the down-converted version of the input signal, the time shift being selected such that a first portion (e.g. first portion A1 of part A) of the input signal is aligned with a second portion (e.g. part C) of the down-converted version of the signal. The one or more first correlations may further comprise correlating a time-shifted version of the input signal and the down-converted version of the input signal, the time shift being selected so that a third portion (e.g. second portion A2 of part A) of the input signal is aligned with a fourth portion (e.g. part B) of the down-converted version of the input signal. Once the first correlation metric has been generated the method 1000 proceeds to block 1004.

At block 1004, one or more second correlations are performed between the input signal and an up-converted version of the input signal and a second correlation metric is generated based on the one or more second correlations. As described above, the up-converted version of the input signal may be generated so that when the input signal has an inverted spectrum the frequency shift in one or more portions of the input signal (e.g. parts C and B) have been removed in the up-converted version of the input signal. The one or more second correlations may comprise correlating the input signal and a time-shifted version of the up-converted version of the input signal, the time shift being selected such that a first portion (e.g. first portion A1 of part A) of the input signal is aligned with a second portion (e.g. part C) of the up-converted version of the input signal. The one or more second correlations may further comprise correlating a time-shifted version of the input signal and the up-converted version of the input signal, the time shift being selected so that a third portion (e.g. second portion A2 of part A) of the input signal is aligned with a fourth portion (e.g. part B) of the up-converted version of the input signal. Once the second correlation metric has been generated the method 1000 proceeds to block 1006.

At block 1006, a determination is made as to whether the input signal comprises a P1 symbol based on a comparison of the first and second correlation metrics. In some cases, it may be determined that there is a P1 symbol in the input signal if only one of the first and second correlation metrics indicates that a P1 symbol has been detected. As described above, in some cases the determination may be made by generating a joint metric based on the first and second correlation metrics and comparing the joint metric to a decision threshold. In some cases, the joint metric may be a ratio of the means or averages of the first and second correlation metrics. In these cases, the input signal may be determined to comprise a P1 symbol if the joint metric is greater than the decision threshold or if the joint metric is less than the inverse of the decision threshold. Once a determination has been made the method 1000 ends.

Although blocks 1002 and 1004 are shown in FIG. 10 as being executed sequentially, in other examples blocks 1002 and 1004 may be executed in parallel.

Figure 11:
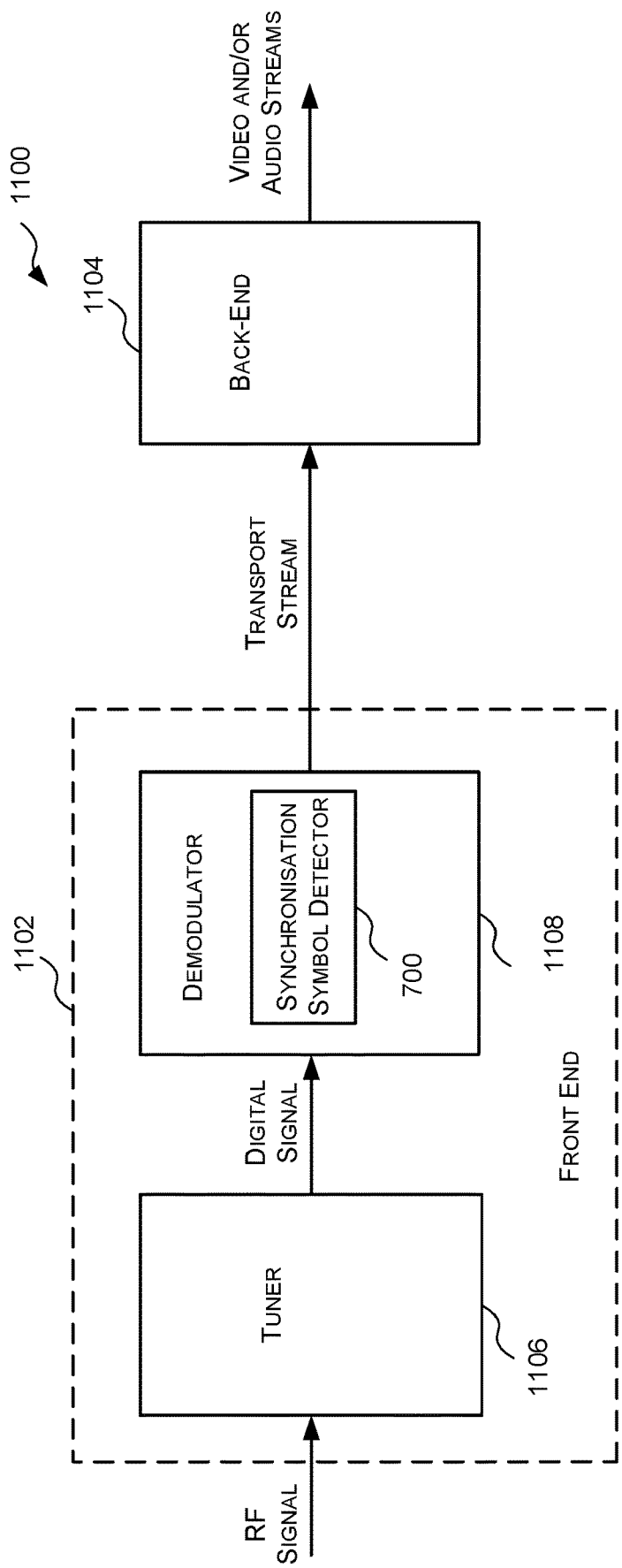
FIG. 11 is a block diagram of an example DVB-T2 receiver comprising the P1 symbol detector of FIG. 7.

Reference is now made to FIG. 11 which illustrates an example DVB-T2 receiver 1100 in which the P1 symbol detector 700 of FIG. 7 may be implemented. The example DVB-T2 receiver 1100 comprises a front-end processing module 1102 and a back-end processing module 1104. The front-end processing module 1102 is configured to receive an RF DVB-T2 signal generated by one or more transmitters and output a transport stream carrying one or more services. The front end-processing module typically comprises a tuner 1106 and a demodulator 1108. The tuner 1106 is configured to receive an RF DVB-T2 signal, down-convert the DVB-T2 signal to an intermediate frequency (IF) or baseband and convert the down-converted signal to a digital signal. The digital signal representing the received RF DVB-T2 signal typically comprises a series of I/Q values. The digital signal representing the received RF signal is provided to the demodulator 1108 which is configured to extract a transport stream from the received RF signal. Part of the demodulation process comprises acquiring and synchronising to the DVB-T2 signal. Accordingly, the demodulator 1108 may comprise a P1 symbol detector, such as the P1 symbol detector 700 of FIG. 7 to detect P1 symbols in the received digital signal. The back-end processing unit 1104 is configured to receive the transport stream output by the demodulator 1108 and output one or more decoded video and/or audio streams.

The P1 detectors, correlation modules and comparison modules of FIGS. 2, 7, 8 and 9 are shown as comprising a number of functional blocks. This is schematic only and is not intended to define a strict division between different logic elements of such entities. Each functional block may be provided in any suitable manner. It is to be understood that intermediate values described herein as being formed by a detector or module need not be physically generated by the detector or module at any point and may merely represent logical values which conveniently describe the processing performed by the detector or module between its input and output.

The synchronisation symbol detectors described herein may be embodied in hardware on an integrated circuit. The synchronisation symbol detectors described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms "computer program code" and "computer readable instructions" as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a synchronisation symbol detector configured to perform any of the methods described herein, or to manufacture a synchronisation symbol detector comprising any apparatus described herein. An integrated circuit definition dataset may be, for example, an integrated circuit description.

Therefore, there may be provided a method of manufacturing, at an integrated circuit manufacturing system, a synchronisation symbol detector as described herein. Furthermore, there may be provided an integrated circuit definition dataset that, when processed in an integrated circuit manufacturing system, causes the method of manufacturing a synchronisation symbol detector to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a synchronisation symbol detector will now be described with respect to FIG. 12.

Figure 12:
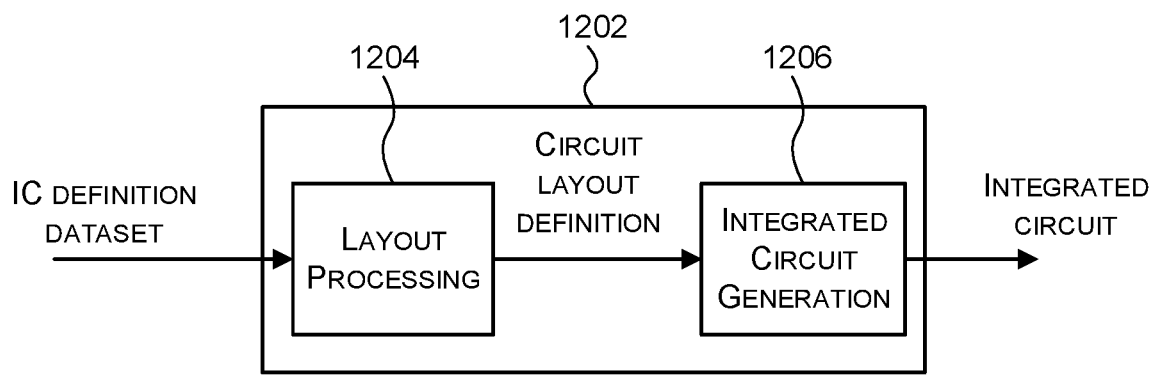
FIG. 12 is a block diagram of an example integrated circuit manufacturing system for generating an integrated circuit embodying the P1 symbol detector of FIG. 7.

FIG. 12 shows an example of an integrated circuit (IC) manufacturing system 1202 which is configured to manufacture a synchronisation symbol detector as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a synchronisation symbol detector as described in any of the examples herein), process the IC definition dataset, and generate an IC according to the IC definition dataset (e.g. which embodies a synchronisation symbol detector as described in any of the examples herein). The processing of the IC definition dataset configures the IC manufacturing system 1202 to manufacture an integrated circuit embodying a synchronisation symbol detector as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a synchronisation symbol detector without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A synchronisation symbol detector circuit for detecting a synchronisation symbol in an input signal, the detector comprising:
   first correlation logic configured to perform one or more first correlations between the input signal and a down-converted version of the input signal and generate a first correlation metric based on the one or more first correlations;
   second correlation logic configured to perform one or more second correlations between the input signal and an up-converted version of the input signal and generate a second correlation metric based on the one or more second correlations; and
   comparison logic configured to:
      determine whether the input signal comprises a synchronisation symbol based on a comparison of the first and second correlation metrics and output an indication of the determination, and
      in response to determining that the input signal comprises a synchronisation symbol, estimate a time position of the synchronisation symbol based on the first and second correlation metrics and output an indication of the estimate.

2. The synchronisation symbol detector circuit of claim 1, wherein the first correlation metric indicates whether the input signal comprises the synchronisation symbol under a first set of conditions, and the second correlation metric indicates whether the input signal comprises the synchronisation symbol under a second set of conditions.

3. The synchronisation symbol detector circuit of claim 2, wherein one of the first and second set of conditions is that the input signal has a normal spectrum and the other of the first and second set of conditions is that the input signal has an inverted spectrum.

4. The synchronisation symbol detector circuit of claim 1, wherein the comparison logic is configured to generate a joint metric based on the first and second correlation metrics and to determine whether the input signal comprises a synchronisation symbol based on a comparison of the joint metric and a decision threshold.

5. The synchronisation symbol detector circuit of claim 4, wherein the comparison logic is configured to determine that the input signal comprises a synchronisation symbol if the joint metric is greater than the decision threshold or if the joint metric is less than the inverse of the decision threshold.

6. The synchronisation symbol detector circuit of claim 5, wherein each of the first and second correlation metrics comprise a plurality of values and the joint metric is a ratio of the mean of the values of the first correlation metric and the mean of the values of the second correlation metric.

7. The synchronisation symbol detector circuit of claim 1, wherein the comparison logic is further configured to, in response to determining that the input signal comprises a synchronisation symbol, determine whether the input signal has a normal spectrum or an inverse spectrum based on the first and second correlation metrics.

8. The synchronisation symbol detector circuit of claim 7, wherein the comparison logic is configured to generate a joint metric based on the first and second correlation metrics and to determine that the input signal has a normal spectrum if the joint metric is greater than a decision threshold and is configured to determine that the input signal has an inverse spectrum if the joint metric is less than the inverse of the decision threshold.

9. The synchronisation symbol detector circuit of claim 1, wherein the comparison logic is configured to estimate the time position of the synchronisation symbol based on a ratio of a modified first correlation metric and a modified second correlation metric where the modified first and second correlation metrics are generated by adding a predetermined constant to the first and second correlation metrics.

10. The synchronisation symbol detector circuit of claim 9, wherein the comparison logic is configured to estimate the time position of the synchronisation symbol as a position of the ratio of the modified first and second correlation metrics which exceeds a predetermined threshold.

11. The synchronisation symbol detector circuit of claim 1, wherein:
   the synchronisation symbol comprises a first portion and a second portion, the second portion being a frequency-shifted version of the first portion; and
   the one or more first correlations comprises a correlation between a time-shifted version of the input signal and the down-converted version of the input signal, the time shift selected so as to align the first portion of the time-shifted version of the input signal with the second portion of the down-converted version of the input signal.

12. The synchronisation symbol detector circuit of claim 11, wherein:
the synchronisation symbol further comprises a third portion and a fourth portion, the fourth portion being a frequency-shifted version of the third portion; and
the one or more first correlations further comprises a correlation between the input signal and a time-shifted version of the down-converted version of the input signal, the time-shift selected so as to align the third portion of the input signal and the fourth portion of the time-shifted version of the down-converted version of the input signal.

13. The synchronisation symbol detector circuit of claim 1, wherein the first correlation logic is configured to generate the first correlation metric by combining a result of each of the one or more first correlations.

14. The synchronisation symbol detector circuit of claim 1, wherein the first and second correlation logic are configured to perform the one or more first correlations in parallel with the one or more second correlations.

15. The synchronisation symbol detector circuit of claim 1, wherein the synchronisation symbol is an ATSC 3.0 symbol.

16. The synchronisation symbol detector circuit of claim 1, wherein the synchronisation symbol detector circuit is embodied in hardware on an integrated circuit.

17. A method of detecting a synchronisation symbol in an input signal, the method comprising:
performing one or more first correlations between the input signal and a down-converted version of the input signal and generating a first correlation metric based on the one or more first correlations;
performing one or more second correlations between the input signal and an up-converted version of the input signal and generating a second correlation metric based on the one or more second correlations;
determining whether the input signal comprises a synchronisation symbol based on a comparison of the first and second correlation metrics;
in response to determining that the input signal comprises a synchronisation symbol, estimating a time position of the synchronisation symbol based on the first and second correlation metrics; and
outputting an indication of the determination and an indication of the estimate of the time position of the synchronisation symbol.

18. A non-transitory computer readable storage medium having stored thereon computer readable instructions that, when executed at a computer system, cause the computer system to perform a method of detecting a synchronisation symbol in an input signal, the method comprising:
performing one or more first correlations between the input signal and a down-converted version of the input signal and generating a first correlation metric based on the one or more first correlations;
performing one or more second correlations between the input signal and an up-converted version of the input signal and generating a second correlation metric based on the one or more second correlations;
determining whether the input signal comprises a synchronisation symbol based on a comparison of the first and second correlation metrics;
in response to determining that the input signal comprises a synchronisation symbol, estimating a time position of the synchronisation symbol based on the first and second correlation metrics; and
outputting an indication of the determination and an indication of the estimate of the time position of the synchronisation symbol.

* * * * *